Figure 1:
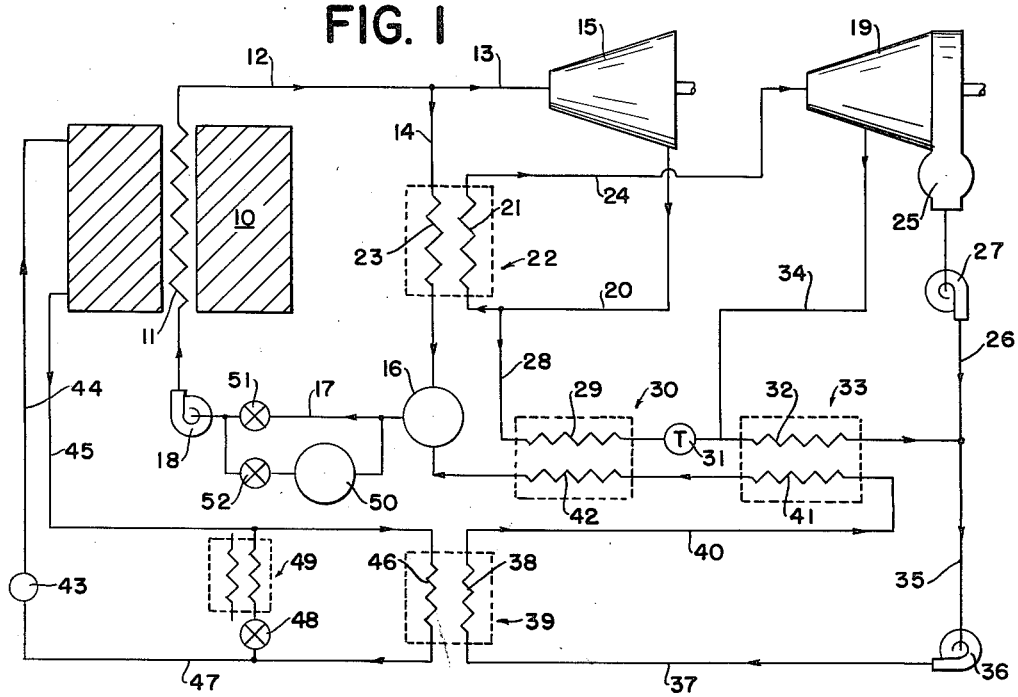

July 31, 1962

G. J. YOUNG ET AL 3,047,479

STEAM REACTOR SYSTEM

Filed Sept. 9, 1957

*INVENTORS*
*GALE J. YOUNG*
BY *DAVID M. POOLE*

ATTORNEYS

United States Patent Office 3,047,479
Patented July 31, 1962

3,047,479
STEAM REACTOR SYSTEM
Gale J. Young, Hawthorne, and David M. Poole, Rye, N.Y., assignors to United Nuclear Corporation, New York, N.Y., a corporation of Delaware
Filed Sept. 9, 1957, Ser. No. 682,917
10 Claims. (Cl. 204—154.2)

The present invention relates to systems for the utilization of nuclear energy, and more particularly to a novel and improved steam-water reactor (SWR) system for converting the energy produced by a nuclear reactor into efficiently usable form. In certain of its aspects, the invention also relates to improved methods of converting and utilizing nuclear energy.

The utilization of reactor-developed energy for the production of steam power is, of course, a well-known expedient. However, various heretofore proposed reactor system for producing and utilizing steam power have been relatively inefficient and/or complicated. Thus, in the so-called pressurized water reactor (PWR) system, water is passed through a reactor under pressure, whereby the water is heated while boiling of the water is avoided. The heated water is generally circulated through a heat exchanger, to produce steam, and then returned to the reactor inlet. In the so-called boiling water system (BWR), a certain amount of boiling is permitted, as water is circulated through the reactor, and the steam produced is separated and utilized to drive a turbine, for example. In both the PWR and BWR systems, various considerations limit the maximum temperature to which the water may be heated to approximately 600° F. This limitation prevents the utilization of the heat energy at high efficiencies commensurate with those of modern stationary power plants. Such power plants commonly operate at peak temperatures between 800 and 1200° F.

In the so-called supercritical reactor system, water is passed through a reactor at a pressure in the order of 4000 p.s.i., which enables the water to be heated to around 1000° F. or higher, without boiling. In this system, relatively high thermal efficiencies are obtainable, but substantial problems arise in connection with the physical structures necessary to contain such pressures.

Various other proposals have been advanced for obtaining better thermal efficiencies, such as the use of a liquid metal, e.g. sodium, or gas, e.g. carbon dioxide, as a heat transfer or working medium. In some cases, the medium is used to produce steam which drives a turbine; in other cases, a gaseous medium is fed directly to a gas turbine. However, these and other known arrangements are not entirely satisfactory for power production due to various practical problems.

The thermal efficiency of a steam power plant, for example, is directly related to the ratio between the inlet and exhaust absolute temperatures. Currently, the most efficient machines are designed for steam which is supplied at a high degree of superheat and which is ultimately exhausted and condensed at relatively low temperature and pressure. These changes of state are a necessary consequence of utilizing a high proportion of the available energy in the steam.

In a closed cycle system, the condensate must be preheated in a liquid state, converted to vapor by boiling, and then superheated. A nuclear reactor to perform all of these functions (preheat, boiling, superheat) might require two or three regions because of the different heat transfer processes involved. In addition to the resultant complexity control problems might arise because the energies involved in the three processes will not remain in the same ratio under all operating conditions.

Control of the fission process is also greatly complicated by the presence of two phases of the working fluid in the reactor, especially where the coolant is a more effective moderator in one phase than the other, as water is.

We have invented a power producing nuclear reactor system in which a nuclear reactor supplies superheated condensable working medium to a high efficiency energy conversion apparatus. The medium may undergo one or more changes of phase in the conversion apparatus, but is so treated that it does not undergo a change of phase as it is heated in the reactor. In accordance with the present invention, an easily vaporizable and condensable medium such as steam produced from ordinary water or, where desirable, from heavy water ($D_2O$), may be used as the reactor coolant and as the working fluid in a closed cycle system for a nuclear reactor producing power to drive a high efficiency turbine or other energy conversion apparatus. The steam is circulated through the reactor so that its temperature is raised from relatively low values at the reactor inlet to a much higher temperature at the reactor outlet. Only part of the superheated steam produced by the reactor is used as primary heat transfer or working fluid medium from which usable energy is derived by a turbine or other energy conversion element. Conventionally, this part of the medium may be reduced to the liquid phase in the energy conversion apparatus.

Another part of the high temperature steam is by-passed around the turbine or other conversion element and is used to reheat to the vaporous phase that part of the medium from which usable energy has been obtained. It will be understood that the part of the medium returning from the turbine or other element may be in the liquid phase prior to reheating, but that the medium entering the reactor inlet is substantially in the vaporous state and is then superheated to a high temperature in the reactor without undergoing a change of phase.

A basic feature of our new steam-water reactor is the provision of an energy transfer system which permits the use of simply constructed and easily controlled nuclear reactors in combination with modern highly efficient energy conversion apparatus such as steam turbines.

One of the more specific features of the invention resides in the provision of a reactor energy utilization system of the type and having the characteristics set forth above, in which heat extracted from a reactor, by way of reactor moderating means, is imparted to the circulating medium as it returns to the reactor inlet, providing a portion of the heat energy required to place the medium in a vaporous phase prior to its passage through the reactor. Alternatively, the foregoing may be accomplished by passing condensed circulating medium in heat exchange relation to the reactor moderating means or system, or by circulating a portion of the medium through the reactor in a manner such that the medium itself forms the reactor moderating means.

Figure 2:
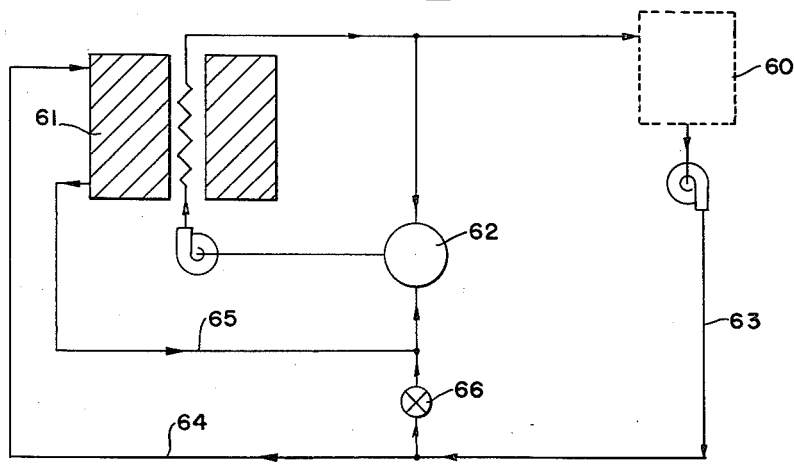

The above and other features of our new steam-water reactor will be more fully understood by reference to the following description of a preferred embodiment of the invention, taken in conjunction with the accompanying drawings, in which:

FIG. 1 is a simplified schematic representation of a reactor energy utilization system incorporating features of the invention; and FIG. 2 is a simplified schematic representation of a modified form of the new system.

Referring now to the drawing, and initially to FIG. 1 thereof, the numeral 10 designates a nuclear reactor unit which, in itself, may be of any suitable type. The specific structural features of the reactor are outside the scope of this application, but it is pertinent to note that the reactor has passage means therein, generally designated by the numeral 11, for circulating a condensable medium such as steam in heat exchange relation to reactor fuel elements (not specifically shown). In the illustrated system, the passage means 11 may be designed to contain steam at a pressure on the order of 2000 p.s.i.a., but it is to be understood that the pressure of the medium in the reactor may be varied considerably for specific applications.

Communicating with the reactor passage means 11 is a steam line 12, which connects with steam lines 13, 14. The line 13, in accordance with the invention, leads to a heat energy conversion element, such as turbine 15, while the line 14 constitutes a recirculation line, leading back to the reactor passage 11, through a mixing boiler 16, return line 17 and steam blower 18.

In the illustrated system, the heat energy of the circulating medium is extracted in stages in the turbine 15, which may be a high pressure steam turbine, and in a second turbine 19, which may be a low pressure steam turbine. To this end, the steam exhausted by the high pressure turbine 15 may be taken off through an exhaust line 20 leading to a set of passages 21 of a heat exchanger 22. The other set of passages 23 of the exchanger 22 is in series in the recirculating line 14, and as exhaust medium passes through the passage 21 it is heated to a desired temperature. The heated medium leaving the passage 21 is passed through a connecting line 24, leading to the inlet of the second stage or low pressure turbine 19. Exhaust medium from the low pressure turbine is condensed in a vacuum condenser 25 and conveyed through a return line 26 by a condensate pump 27, the exhaust medium at this point being in the form of a liquid condensate.

As shown in FIG. 1, some of the exhaust medium from the first stage turbine 15 may be drawn off through an extraction line 28 and passed serially through a set of passages 29 of a heat exchanger 30, a throttling valve 31 and a set of passages 32 of a second heat exchanger 33. The outlet of heat exchanger passages 32 is connected to the return line 26, on the outlet side of pump 27.

A portion of the medium flowing through the second stage turbine 19 may also be drawn off through an extraction line 34, which is connected to the inlet of heat exchanger passages 32 on the low pressure side of the throttling valve 31.

The combined flow through the return line 26 and heat exchanger passages 32 enters a line 35 leading to a pressure pump 36; and it will be observed that the flow of medium through the pump 36 is equal to that through the steam line 13, leakage excepted.

Condensate leaving the pump 36 flows serially through a return line 37, passages 38 of a heat exchanger 39, line 40 and passages 41, 42 of heat exchangers 33, 30, respectively, to the mixing boiler 16. As will be more fully described, the condensate is heated to some degree in the heat exchanger 39. Additional heat is imparted to the condensate as it passes through heat exchangers 33, 30. And, in accordance with the invention, the thus preheated condensate is mixed, in the boiler 16, with superheated steam from the recirculating line 14. The volume of steam flowing into the boiler 16 from line 14 is such, in relation to the volume of condensate entering the boiler and in relation to the respective temperatures of the steam and condensate, that the entire combined volume of medium leaves the boiler and enters the return line 17 as steam, the steam being saturated or at relatively low superheat as will be understood.

Steam from the return line 17 enters the steam blower 18, which may be a suitable centrifugal compressor, for example, wherein the pressure of the medium is raised somewhat above the pressure of the medium in the recirculating line 14.

In the illustrative system of FIG. 1, the reactor 10 is moderated by ordinary or heavy water as required by the particular fuel being used in the reactor. The moderator is circulated in a cooling system comprising a pump 43, delivery line 44 leading from the pump to the reactor, return line 45 leading from the reactor, passages 46 of heat exchanger 39, and a line 47 leading from the heat exchanger passages 46 to the inlet of pump 43. When the reactor 10 is in operation, the moderator becomes heated and requires cooling. To this end, the heated fluid in the moderator cooling system flows through line 45 and is passed in counterflow, heat exchange relation to the main circulating medium condensate in heat exchanger 39. This simultaneously extracts excess heat from the moderator fluid and transfers it to the low temperature condensate flowing toward the mixing boiler 16.

In some instances, particularly when the reactor energy system is operating at low output in relation to rated capacity, the flow of condensate may be insufficient to extract the heat from the moderator system. Accordingly, it may be expedient to provide an auxiliary cooling system, comprising a valve 48, heat exchanger 49 and external cooling media, not specifically indicated.

It will be understood, of course, that in the system of FIG. 1, as well as in modified systems, one of which will be described, the fluid flowing in the moderator cooling system need not, in itself, be used as a moderator. Alternatively, the reactor may be moderated with a solid such as graphite, for example, with the fluid in the moderator system being used merely as a coolant. In some cases, separate cooling of a solid moderator may not be required.

By way of illustration only, the system of FIG. 1, in a typical application, may operate as follows: Utilizing a reactor of, for example, about 500 megawatts power, steam (either $H_2O$ or $D_2O$) at about 2100 p.s.i.a. and 635° F. may be introduced into the reactor passage 11, at a rate of about 1200 lb./sec. The steam is heated in the reactor to a temperature of about 1050° F., and has an exit pressure of about 2015 p.s.i.a.

The steam output of the reactor is, in accordance with the invention, divided into steam lines 13 and 14. By way of illustration and comparison, it may be assumed that steam moves through the line 13 at a flow rate of 1.00, in which case there may be a flow rate of 2.22 in the recirculating line 14, making a total steam flow rate at the reactor of 3.22. Flow rate is herein expressed in arbitrary units of weight per unit of time. As related to a total reactor flow of 1200 lb./sec., for example, a flow rate of 1.00 represents approximately 372 lb./sec.

Steam flowing through the turbine 15 is exhausted at a pressure of about 550 p.s.i.a. and temperature of 720° F. Some of the exhaust steam is reheated in the heat exchanger 22 to about 1000° F. prior to entering the low pressure turbine 19. The flow rate to the turbine 19 may be about 0.88, with flow at the rate of about 0.12 being tapped off through line 28 for purposes of feed water heating.

A portion of the steam flowing through the turbine 19 is taken off through tap line 34 for feed water heating, this steam being at a pressure of about 140 p.s.i.a. and temperature of 480° F. The flow rate of this steam may be about 0.10. The remainder of the steam flowing through the turbine 19 (flow rate about 0.78) is condensed in the condenser 25, at an absolute pressure of about 1.5 inches of mercury. The pump 27 raises this pressure to about 120 p.s.i.a.

Condensate in line 26 combines with condensate from the feed water heat exchangers 30, 33, and the combined flow (at a flow rate of 1.00) enters the pressure pump 36 at a temperaure of about 125° F. The pump 36 raises the pressure of the condensate to about 2100 p.s.i.a., and the high pressure condensate, in passing through heat exchanger coils 38, 41, 42 is heated to about 470° F.

In accordance with the invention, the condensate enters the mixing boiler 16 and there combines with steam from the recirculating line 14, to form steam at a pressure of about 2000 p.s.i.a. and temperature of about 640° F. The flow rate leaving the boiler 16 is, of course, 3.22. The combined flow of low temperature steam enters the steam blower 18, which raises the pressure of the steam to about 2100 p.s.i.a.

For starting the system of FIG. 1, a small, oil fired boiler 50 may be provided in the system for selective operation therein. By means of valves 51, 52, the boiler 50 may be placed in series in the flow line between the mixing boiler 16 and the steam blower 18. Thus, during start-up of the system, the circulating medium may be heated to its vaporous phase prior to starting the reactor 10, so that change of phase within the reactor is avoided.

During normal operation of the system of FIG. 1, the moderating medium may reach a temperature of about 230° F. By circulating the moderating medium through the heat exchanger 39, the temperature of the medium may be reduced to about 140° F. prior to entry into the the reactor.

It should be understood that the foregoing explanation of the operation of our new steam-water reactor is illustrative only. The various specified temperatures and pressures may be varied considerably, and many features of the system may be omitted when they are not essential to the operation of a particular installation.

In some cases it may be desirable for the energy output of the reactor to be delivered to the turbine or other conversion element by means of thermally coupled, but physically isolated, systems. Such an arrangement may be required to avoid the possibility of passing radioactive steam into the turbine. A slight loss of overall efficiency is, of course, experienced.

In the modified system of FIG. 2, part of the return flow of condensate, from an energy conversion element 60, is diverted into the reactor as a moderator medium or moderator coolant. Thus, a reactor 61 heats an easily condensable medium, in a vaporous phase, and the heated medium is directed in part to the conversion element 60, which may be a turbine, for example, and in part to a mixing boiler 62. Low temperature condensate from the conversion element 60 returns through a line 63 and is permitted to flow, at least in part, through a line 64 to the reactor 61, to act as a moderator or moderator coolant. The condensate is heated somewhat in the reactor and flows therefrom to the mixing boiler 62, through a return line 65.

Regulation of the flow of moderator medium, in the system of FIG. 2, may be accomplished by providing a bypass valve 66, which connects lines 64, 65 in parallel with the flow circuit through the reactor. By appropriate control of the valve 66, the flow of medium through the moderating circuit may be proportioned to the total flow of medium, the remainder of the flow passing directly to the mixing boiler 62, through the bypass valve.

One of the important advantages of the new system resides in the fact that an easily vaporizable and condensable medium, such as ordinary water or heavy water steam, may be heated in a reactor to a high temperature, for effective utilization in conjunction with modern, high efficiency energy conversion elements, such as turbines. This advantage is realized, in accordance with the invention, by furnishing an easily vaporizable and condensable circulating medium to the reactor inlet in vaporous form, so that no change of phase takes place within the reactor. The steam entering the reactor may be heated to a high temperature, and in this manner, high thermal efficiency is achieved, while unduly high pressures and/or complicated transfer systems are avoided.

Another advantageous feature of the invention resides in the fact that the condensability characteristic of an easily vaporizable and condensable circulating medium may be utilized to obtain high operating efficiency in an energy conversion element, such as a turbine, while, at the same time, condensed medium is convered to its vaporous phase before it is recirculated through the reactor. This is accomplished by providing a mixing chamber into which a portion of the high temperature vaporous medium is diverted. The high temperature vaporous medium changes the condensate to its vaporous phase, in the manner desired. And, as an additional advantage, the foregoing arrangement permits of the convenient addition of make-up medium into the mixing chamber, where impurities may be precipitated prior to entry of the medium into the reactor.

The new system may take several specific forms, as suggested by the various illustrative embodiments described herein. Accordingly, reference should be made to the following appended claims in determining the full scope of the invention.

We claim:

1. The method of utilizing heat energy produced by the fission process occurring in a nuclear power reactor which comprises passing an easily vaporizable and condensable medium in its vaporous phase through said reactor in heat exchange relation to at least a portion of said reactor in which heat energy is produced by said fission process to heat the vaporous medium, condensing at least a portion of the heated, vaporous medium, transforming the condensed medium in its vaporous phase by mixing therewith a portion of heated, vaporous medium, and recirculating the transformed medium through the reactor in heat exchange relation.

2. The method of utilizing heat energy produced by the fission process occurring in a nuclear power reactor which comprises passing steam through said reactor in heat exchange relation to at least a portion of said reactor in which heat energy is produced by said fission process to heat the steam, extracting heat from a portion of the steam externally of the reactor to form water condensate, vaporizing the condensate to form steam by mixing therewith another portion of the steam heated in the reactor and recirculating the thus formed steam through the reactor in heat exchange relation.

3. The method according to claim 2, in which the condensate is heated prior to vaporization by utilizing the condensate as a neutron moderator for said reactor.

4. A system for the utilization of heat energy produced by the fission process occurring in a power producing nuclear reactor, which system comprises a nuclear reactor, an energy conversion element, a fluid medium of a type which may be transformed to the vaporous state upon heating and which may be easily condensed upon cooling, heat transfer means in said reactor for absorbing heat energy produced by the fission process occurring in said reactor and adapted to transfer heat to fluid medium in vaporous state and thereby cool said reactor, means to circulate fluid medium in vaporous state through said heat transfer means, means to convey a first portion of the heated, vaporous medium to said energy conversion element wherein said medium may be condensed, means for recirculating a second portion of said heated, vaporous medium, means to convey condensed medium from said conversion element, means external to said reactor for combining the condensed and the recirculated portions of the medium to form a vaporous medium, and means for conveying the vaporous medium to said heat transfer means.

5. A system according to claim 4 in which the reactor is provided with a moderator, means for removing heat generated in said moderator to the exterior of said reactor, and means for transferring said removed heat to the condensed medium.

6. A system according to claim 4 in which the reactor is provided with a fluid moderator, means for circulating said moderator to the exterior of said reactor, said means for circulating said moderator including heat exchange means for transferring heat from said moderator to said condensed medium.

7. A system for the utilization of heat energy produced by the fission process occurring in a power producing nuclear reactor which system comprises a nuclear reactor, an energy conversion element, a fluid medium of a type which may be transformed to the vaporous state upon heating and which may be easily condensed upon cooling, heat transfer means in said reactor for absorbing heat energy produced by the fission process occurring in said reactor and adapted to transfer heat to fluid medium in vaporous state and thereby cool said reactor, means including said conversion element for effecting condensation of heated vaporous medium, means external to said reactor for utilizing at least a portion of the heat energy developed in said reactor and means to convey the transformed medium to said heat transfer means in said reactor.

8. A system according to claim 7 in which said reactor comprises fluid neutron moderating means and in which the means for heating the condensed medium comprises, in part, means for passing the condensed medium in heat exchange relation to said moderating means.

9. A system according to claim 7, in which the means for heating the condensed medium comprises means external to said reactor for transferring heat to said condensed medium from at least a portion of the vaporous medium heated in said heat transfer means.

10. A system according to claim 7, in which the means for heating the condensed medium comprises means external of said reactor for mixing with said condensed medium a portion of the heated, vaporous medium, which portion is sufficient to transform the mixture to the vaporous phase.

References Cited in the file of this patent

UNITED STATES PATENTS

| | | |
|---|---|---|
| 258,933 | Litchfield et al. | June 6, 1882 |
| 274,975 | Renshaw | Apr. 3, 1883 |
| 1,002,804 | Bunker et al. | Sept. 5, 1911 |
| 2,787,593 | Metcalf | Apr. 2, 1957 |
| 2,806,820 | Wigner | Sept. 17, 1957 |

OTHER REFERENCES

Progress Report on Dresden Station, a design description the Dresden Nuclear Power Station. Presented at A.S.M.E. Annual Meeting Nov. 26, 1956. Published by General Electric Co., p. 4.

UNITED STATES PATENT OFFICE
CERTIFICATE OF CORRECTION

Patent No. 3,047,479　　　　　　　　　　　　　　July 31, 1962

Gale J. Young et al.

It is hereby certified that error appears in the above numbered patent requiring correction and that the said Letters Patent should read as corrected below.

Column 5, line 71, for "convered" read -- converted --; column 6, line 21, for "in" read -- to --.

Signed and sealed this 20th day of November 1962.

(SEAL)
Attest:

ERNEST W. SWIDER
Attesting Officer

DAVID L. LADD
Commissioner of Patents